(12) United States Patent
Yang et al.

(10) Patent No.: US 7,884,798 B2
(45) Date of Patent: Feb. 8, 2011

(54) PROTECTIVE MECHANISM FOR AN OPTICAL INPUT DEVICE

(75) Inventors: Yao-Chi Yang, San Chong (TW);
Sheng-Zun Qiu, San Chong (TW)

(73) Assignee: KYE Systems Corp. (TW)

( * ) Notice: Subject to any disclaimer, the term of this patent is extended or adjusted under 35 U.S.C. 154(b) by 1481 days.

(21) Appl. No.: 11/281,270

(22) Filed: Nov. 16, 2005

(65) Prior Publication Data

US 2007/0040804 A1    Feb. 22, 2007

(51) Int. Cl.
*G09G 5/08* (2006.01)
(52) U.S. Cl. ........................ 345/158; 345/156; 345/163; 345/166
(58) Field of Classification Search ......... 345/156–169, 345/204–215
See application file for complete search history.

(56) References Cited

U.S. PATENT DOCUMENTS

| 6,424,335 | B1 * | 7/2002 | Kim et al. | 345/158 |
| 6,922,252 | B2 * | 7/2005 | Harvill et al. | 356/630 |
| 7,002,549 | B2 * | 2/2006 | McCahon et al. | 345/156 |
| 7,298,359 | B2 * | 11/2007 | Kim et al. | 345/158 |
| 2002/0145588 | A1 * | 10/2002 | McCahon et al. | 345/156 |
| 2008/0045804 | A1 * | 2/2008 | Williams | 600/300 |

* cited by examiner

*Primary Examiner*—Vijay Shankar
(74) *Attorney, Agent, or Firm*—Raymond Sun

(57) ABSTRACT

A protective mechanism terminates the emission of a laser beam from an inadvertently inverted laser input device. A transmitting/detecting circuit is positioned under a laser input device that emits laser beams from a laser light. The transmitting/detecting circuit projects an infrared ray to a working surface to be reflected therefrom, with the reflected infrared ray detected by the transmitting/detecting circuit. The laser light is turned off if the transmitting/detecting circuit fails to detect the reflected infrared ray.

5 Claims, 2 Drawing Sheets

PROTECTIVE MECHANISM FOR AN OPTICAL INPUT DEVICE

BACKGROUND OF THE INVENTION

1. Field of the Invention

The present invention relates to an optical input device, and in particular, to a protective mechanism which detects whether a laser-emitting input device has been inverted during use.

2. Description of the Prior Art

A conventional optical mouse typically uses an optical detecting system to detect the movement of the mouse on a working surface, such that a cursor on a computer display can be controlled simultaneously. This type of technology is illustrated in U.S. Pat. Nos. 5,644,139 and 6,433,780, where an LED (light emitting diode) is adopted as a light source for detecting the movement of an optical mouse.

In order to overcome the divergence of the projected light from the LED, a so-called coherent light is introduced to the optical detecting system. An early example of such a laser optical detecting system for a computer mouse is disclosed in U.S. Pat. No. 4,794,384, in which the coherent light can be a laser beam or the like. U.S. Pat. No. 6,927,758 also discloses a dual lens laser detecting system for more accurate control of the movement of the cursor on the computer display.

Regardless of the type of laser or the type of laser detecting system used, there is still a possibility that the optical input device is inadvertently overturned (i.e., inverted) so that the laser beam is being emitted into the open work area occupied by the user. Even though the manufacturers of these existing optical input devices claim that the laser beam emitted from an inverted optical input device is harmless to the human eye, there is always a potential for harm. Thus, there remains a need to minimize harm arising from exposure to the laser beam from an optical input device.

SUMMARY OF THE DISCLOSURE

It is an object of the present invention to provide a simple and low-cost protective mechanism for use with a laser optical detecting system within an optical input device, which will minimize harm arising from exposure to the laser beam from an optical input device.

To accomplish the objectives of the present invention, the present invention provides a protective mechanism that terminates the emission of a laser beam from an inadvertently inverted laser input device. A transmitting/detecting circuit is positioned under a laser input device that emits laser beams from a laser light. The transmitting/detecting circuit projects an infrared ray to a working surface to be reflected therefrom, with the reflected infrared ray detected by the transmitting/detecting circuit. The laser light is turned off if the transmitting/detecting circuit fails to detect the reflected infrared ray.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
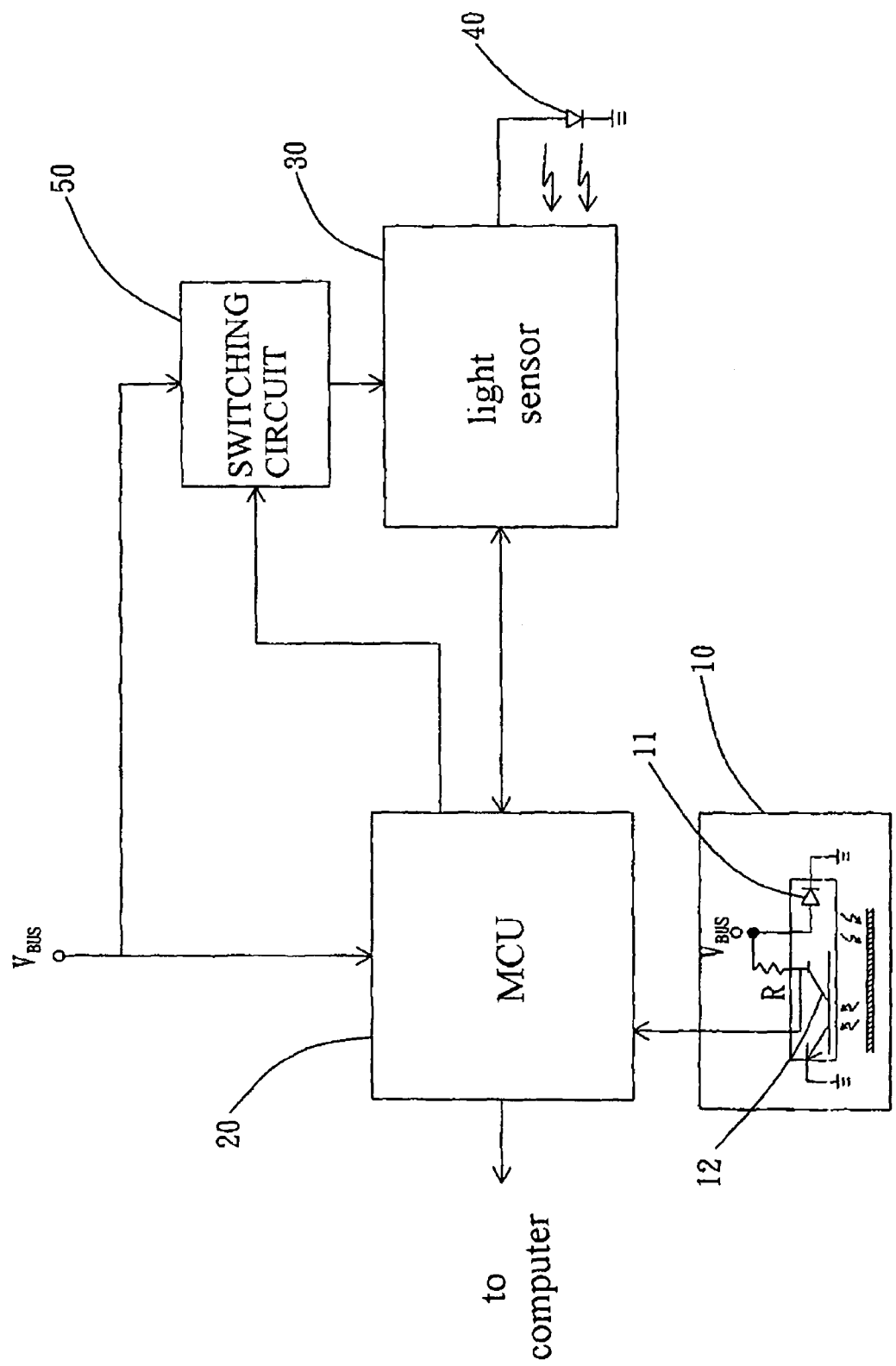
FIG. 1 is a circuit diagram of a first embodiment of a protective mechanism for use with an optical input device according to the present invention.

Referring to FIG. 1, a protective mechanism for an optical input device includes an infrared transmitting/detecting circuit 10 which is positioned under the input device. The input device can be an optical mouse. A MCU (micro control unit) 20 can communicate with a computer via a wired or wireless connection according to principles that are well-known in the art. The MCU 20 is coupled between the infrared transmitting/detecting circuit 10 and a light sensor 30. The light sensor 30 is further coupled between a laser light 40 and the MCU 30. The power is commonly supplied from the $V_{BUS}$, which can be a power supply from a power source such as a battery, a capacitor, a solar cell or the like. A switching circuit 50 is coupled between the $V_{BUS}$ and the light sensor 30.

The following description of the operation of an optical input device is well-known in the art. The laser light 40 is driven by a driving signal which is generated by the light sensor 30. This driving signal causes the laser light 40 to project a laser beam on to a working surface, such as the surface of a table, a desk or the like. The light sensor 30 receives a reflected laser beam from the working surface, which causes the light sensor 30 to generate a cursor-moving signal to the MCU 20, which in turn causes the MCU 20 to generate a cursor control signal for moving a cursor on a computer display simultaneously which is proportional to the cursor-moving signal.

The infrared transmitting/detecting circuit 10 includes an infrared diode 11 and an infrared receiving transistor 12. The infrared diode 11 projects an infrared ray to the working surface, which reflects the infrared ray. The infrared receiving transistor 12 then receives the reflected infrared ray from the working surface. If the transistor 12 of the infrared transmitting/detecting circuit 10 fails to detect the reflected infrared ray, the infrared transmitting/detecting circuit 10 will generate an enabling signal to the MCU 20. When the MCU 20 receives the enabling signal, the MCU 20 outputs a switching signal to the switching circuit 50, causing the switching circuit 50 to turn off the light sensor 30, so that the light sensor 30 stops generating the driving signal forwarded to the laser light 40.

In other words, if the input device is turn over or inverted, the infrared transmitting/detecting circuit 10 will not receive the reflected infrared ray. The infrared transmitting/detecting circuit 10 will then generate an enabling signal to the MCU 20. When the MCU 20 receives the enabling signal, it will output a switching signal to the switching circuit 50, causing the switching circuit 50 to turn off the light sensor 30, and the laser beam emitted by the laser light 40 will be terminated immediately.

Figure 2:
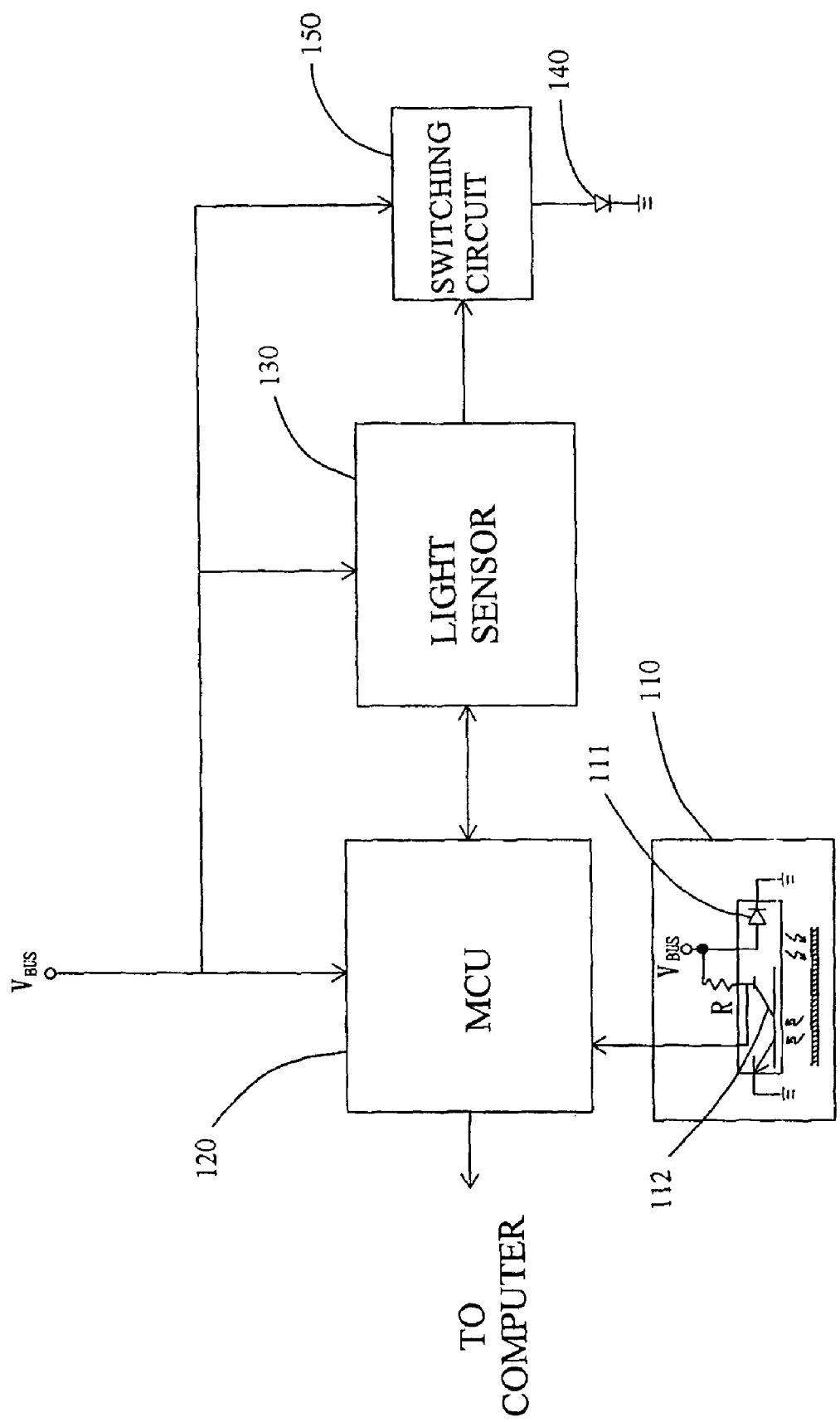
FIG. 2 is a circuit diagram of a second embodiment of a protective mechanism for use with an optical input device according to the present invention.

FIG. 2 illustrates another embodiment of the protective mechanism according to the present invention. The protective mechanism for a laser mouse in this embodiment includes an infrared transmitting and detecting circuit 110, an MCU 120, a light sensor 130 and a laser light 140 that can be same as the corresponding elements 10, 20, 30 and 40 in FIG. 1. The MCU 120 can communicate with a computer via a wired or a wireless connection. The MCU 120 is also coupled between the infrared transmitting and detecting circuit 110 and the light sensor 130. The light sensor 130 is further coupled between the laser light 140 and the MCU 120. The power is supplied from the $V_{BUS}$.

One difference between the embodiments of FIGS. 1 and 2 is that, in the embodiment of FIG. 2, the laser light 140 is directly powered by $V_{BUS}$. Another difference is that the switching circuit 150 in FIG. 2 is coupled between the $V_{BUS}$ and the laser light 140. The switching circuit 50 can be the same as the switching circuit 50. The laser light 140 is also driven by a driving signal which is generated by the light sensor 130 such that the laser light 140 can project a laser beam over a working surface, such as the surface of a table, a desk or the like. The light sensor 130 receives a reflected laser beam from the working surface, which causes the light sensor 130 to generate a cursor-moving signal to the MCU 120, which in turn causes the MCU 120 to generate a cursor control signal for moving a cursor on a computer display.

The infrared transmitting/detecting circuit 110 includes an infrared diode 111 and an infrared receiving transistor 112. The infrared diode 111 projects an infrared ray to the working surface, which reflects the infrared ray. The infrared receiving transistor 112 then receives the reflected infrared ray from the working surface. If the transistor 112 of the infrared transmitting/detecting circuit 110 fails to detect the reflected infrared ray, the infrared transmitting/detecting circuit 110 will generate an enabling signal to the MCU 120. When the MCU 120 receives the enabling signal, the MCU 120 outputs a switching signal to the switching circuit 150, causing the switching circuit 150 to shut off the power supply to the laser light 140 directly.

In other words, if the input device is turn over or inverted, the infrared transmitting/detecting circuit 110 will not receive the reflected infrared ray. The infrared transmitting/detecting circuit 110 will then generate an enabling signal to the MCU 120. When the MCU 120 receives the enabling signal, it will output a switching signal to the switching circuit 150, causing the switching circuit 150 to shut off the power supply of the laser light 140, so that the laser beam emitted by the laser light 140 will be terminated immediately.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A laser input device, comprising:
    a transmitting/detecting circuit;
    a laser light;
    a control unit;
    a switching circuit coupled between a power source and the laser light;
    a light sensor coupled between the laser light and the control unit;
    wherein the laser light projects a laser beam to a working surface to be reflected therefrom, and the light sensor generates a cursor-moving signal to the control unit when the light sensor detects the reflected laser beam;
    wherein the transmitting/detecting circuit projects an infrared ray to the working surface to be reflected therefrom, and detects the reflected infrared ray, the transmitting/detecting circuit generating an enabling signal if the transmitting/detecting circuit fails to detect the reflected infrared ray; and
    wherein the transmitting/detecting circuit provides the enabling signal to the control unit, and the control unit outputs a switching signal such that the switching circuit shuts off the power provided to the laser light, thereby terminating the emission of the laser beam from the laser light.

2. The apparatus of claim 1, wherein the transmitting/detecting circuit further includes an infrared diode and an infrared receiving transistor.

3. The apparatus of claim 1, wherein the working surface is a table top.

4. A method of terminating the emission of a laser light from an inverted laser input device, comprising:
    projecting a laser light from a lower portion of a laser input device towards a working surface;
    positioning a transmitting/detecting circuit under the laser input device;
    projecting an infrared ray from the transmitting/detecting circuit to the working surface to be reflected therefrom;
    detecting the reflected infrared ray by the transmitting/detecting circuit; and
    turning off the laser light if the transmitting/detecting circuit fails to detect the reflected infrared ray.

5. The method of claim 4, further including:
    generating an enabling signal if the transmitting/detecting circuit fails to detect the reflected infrared ray; and
    providing the enabling signal to a control unit, which outputs a switching signal to turn off the laser light.

* * * * *